US012761433B2

(12) United States Patent
Bian et al.

(10) Patent No.: US 12,761,433 B2
(45) Date of Patent: Oct. 13, 2026

(54) PHOTODETECTORS WITH AN INTEGRATED WAVEGUIDE CORE

(71) Applicant: GlobalFoundries U.S. Inc., Malta, NY (US)

(72) Inventors: Yusheng Bian, Ballston Lake, NY (US); Sujith Chandran, Clifton Park, NY (US); Won Suk Lee, Malta, NY (US); Abdelsalam Aboketaf, Essex Junction, VT (US)

(73) Assignee: GlobalFoundries U.S. Inc., Malta, NY (US)

( * ) Notice: Subject to any disclaimer, the term of this patent is extended or adjusted under 35 U.S.C. 154(b) by 426 days.

(21) Appl. No.: 18/405,727

(22) Filed: Jan. 5, 2024

(65) Prior Publication Data

US 2025/0224578 A1 Jul. 10, 2025

(51) Int. Cl.
*G02B 6/42* (2006.01)

(52) U.S. Cl.
CPC .................................. *G02B 6/4295* (2013.01)

(58) Field of Classification Search
CPC .................................................... G02B 6/4295
USPC ............................................................ 385/14
See application file for complete search history.

(56) References Cited

U.S. PATENT DOCUMENTS

2019/0280144 A1* 9/2019 Baudot ................. H10F 30/223
2021/0313306 A1* 10/2021 Hon ................... G02B 6/12004
2021/0389521 A1* 12/2021 Holt ..................... G02B 6/4295
2022/0283391 A1 9/2022 Zhang et al.
2023/0042376 A1 2/2023 Hu et al.

OTHER PUBLICATIONS

European Patent Office; Extended European Search Report and Opinion, issued in European Patent Application No. 24187696.0 on Jan. 15, 2025; 9 pages.
Matthew J. Byrd et al., "Mode-evolution-based coupler for high saturation power Ge-on-Si photodetectors," Optics Letter 42, 851-854 (2017).
Xiao Hu et al., "High-speed and high-power germanium photodetector with a lateral silicon nitride waveguide," Photonics Research 9, 749-756 (2021).
Li, Daimo et al., "High-Speed and High-Power Ge-on-Si Photodetector with Bilateral Mode-Evolution-Based Coupler." Photonics 2023, 10(2), 142; https://doi.org/10.3390/photonics10020142 (2023).
K. Giewont et al., "300-mm Monolithic Silicon Photonics Foundry Technology," in IEEE Journal of Selected Topics in Quantum Electronics, vol. 25, No. 5, pp. 1-11, Sep.-Oct. 2019, Art No. 8200611, doi: 10.1109/JSTQE.2019.2908790.

(Continued)

*Primary Examiner* — Jerry M Blevins
(74) *Attorney, Agent, or Firm* — Thompson Hine LLP; Anthony Canale

(57) ABSTRACT

Structures for a photonics chip that include a photodetector and methods of forming such structures. The structure comprises a photodetector including a pad and a semiconductor layer on the pad. The pad includes a side edge and a first waveguide core that extends from the side edge adjacent to the semiconductor layer. The structure further comprises a second waveguide core including a section adjoined to the side edge of the pad adjacent to the first waveguide core.

20 Claims, 14 Drawing Sheets

(56) References Cited

OTHER PUBLICATIONS

M. Rakowski et al., "45nm CMOS—Silicon Photonics Monolithic Technology (45CLO) for next-generation, low power and high speed optical interconnects," in Optical Fiber Communication Conference (OFC) 2020, OSA Technical Digest (Optica Publishing Group), paper T3H.3 (2020).
Y. Bian et al., "Towards low-loss monolithic silicon and nitride photonic building blocks in state-of-the-art 300mm CMOS foundry," in Frontiers in Optics / Laser Science, B. Lee, C. Mazzali, K. Corwin, and R. Jason Jones, eds., OSA Technical Digest (Optica Publishing Group), paper FW5D.2 (2020).
Y. Bian et al., "Hybrid III-V laser integration on a monolithic silicon photonic platform," in Optical Fiber Communication Conference (OFC) 2021, P. Dong, J. Kani, C. Xie, R. Casellas, C. Cole, and M. Li, eds., OSA Technical Digest (Optica Publishing Group), paper M5A.2 (2021).
Y. Bian et al., "3D Integrated Laser Attach Technology on 300-mm Monolithic Silicon Photonics Platform," 2020 IEEE Photonics Conference (IPC), Vancouver, BC, Canada, 2020, pp. 1-2, doi: 10.1109/IPC47351.2020.9252280.
B. Peng et al., "A CMOS Compatible Monolithic Fiber Attach Solution with Reliable Performance and Self-alignment," in Optical Fiber Communication Conference (OFC), OSA Technical Digest (Optica Publishing Group, 2020), paper Th3I.4 (2020).
Y. Bian et al., "Monolithically integrated silicon nitride platform," 2021 Optical Fiber Communications Conference and Exhibition (OFC), pp. 1-3; Th1A.46 (2021).
A. Aboketaf et al., "Towards fully automated testing and characterization for photonic compact modeling on 300-mm wafer platform," 2021 Optical Fiber Communications Conference and Exhibition (OFC), 2021, pp. 1-3.
A. Chowdhury et al., "High Performance Avalanche Photodiode in a Monolithic Silicon Photonics Technology," 2022 Optical Fiber Communications Conference and Exhibition (OFC), 2022, pp. 1-3.
W. S. Lee et al., "Automatic Waveguide Balancing Using Point Set Operations," 2022 Optical Fiber Communications Conference and Exhibition (OFC), San Diego, CA, USA, 2022, pp. 1-3.
Bian, Yusheng, "Photonic Structure With Waveguide-to-Photodetector Coupler Oriented Along Sidewall of a Photodetector" filed on Oct. 27, 2022 as a U.S. Appl. No. 18/050,147.

* cited by examiner

PHOTODETECTORS WITH AN INTEGRATED WAVEGUIDE CORE

BACKGROUND

The disclosure relates to photonics chips and, more specifically, to structures for a photonics chip that include a photodetector and methods of forming such structures.

Photonics chips are used in many applications and systems including, but not limited to, data communication systems and data computation systems. A photonics chip includes a photonic integrated circuit comprised of photonic components, such as modulators, polarizers, and optical couplers, that are used to manipulate light received from a light source, such as an optical fiber or a laser. A photodetector may be employed in the photonic integrated circuit to convert light, which may be modulated as an optical signal, into an electrical signal. The responsivity of a photodetector is a measure of the optical-to-electrical conversion efficiency. A photodetector may suffer from degraded performance metrics, such as responsivity, at high optical powers. The degraded responsivity may have a negative impact on system level performance.

Improved structures for a photonics chip that include a photodetector and methods of forming such structures are needed.

SUMMARY

In an embodiment of the invention, a structure for a photonics chip is provided. The structure comprises a photodetector including a pad and a semiconductor layer on the pad. The pad includes a side edge and a first waveguide core that extends from the side edge adjacent to the semiconductor layer. The structure further comprises a second waveguide core including a section adjoined to the side edge of the pad adjacent to the first waveguide core.

In an embodiment of the invention, a method of forming a structure for a photonics chip is provided. The method comprises forming a photodetector that includes a pad and a semiconductor layer on the pad. The pad includes a side edge and a first waveguide core that extends from the side edge adjacent to the semiconductor layer. The method further comprises forming a second waveguide core that includes a section adjoined to the side edge of the pad adjacent to the first waveguide core.

BRIEF DESCRIPTION OF THE DRAWINGS

The accompanying drawings, which are incorporated in and constitute a part of this specification, illustrate various embodiments of the invention and, together with a general description of the invention given above and the detailed description of the embodiments given below, serve to explain the embodiments of the invention. In the drawings, like reference numerals refer to like features in the various views.

DETAILED DESCRIPTION

Figure 1:
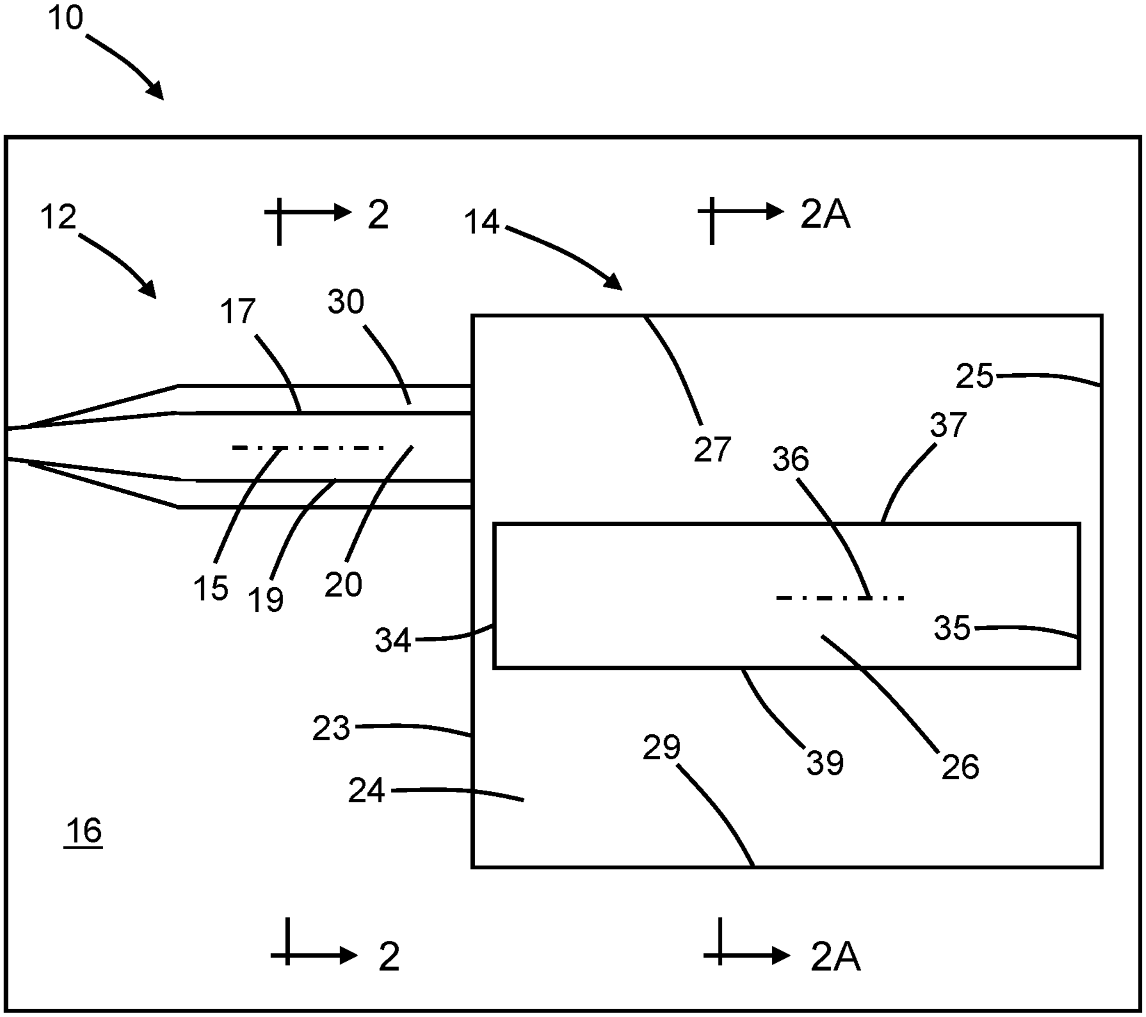
FIG. 1 is a top view of a structure at an initial fabrication stage of a processing method in accordance with embodiments of the invention.
Figure 2:
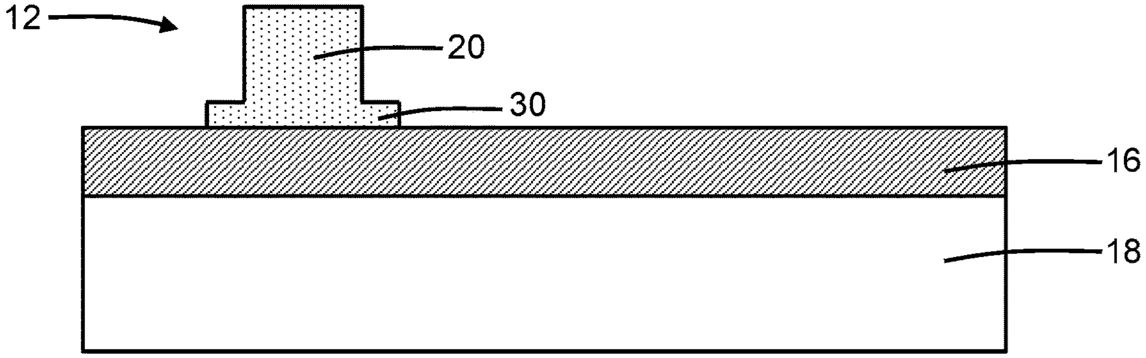
FIG. 2 is a cross-sectional view taken generally along line 2-2 in FIG. 1.
Figure 2A:
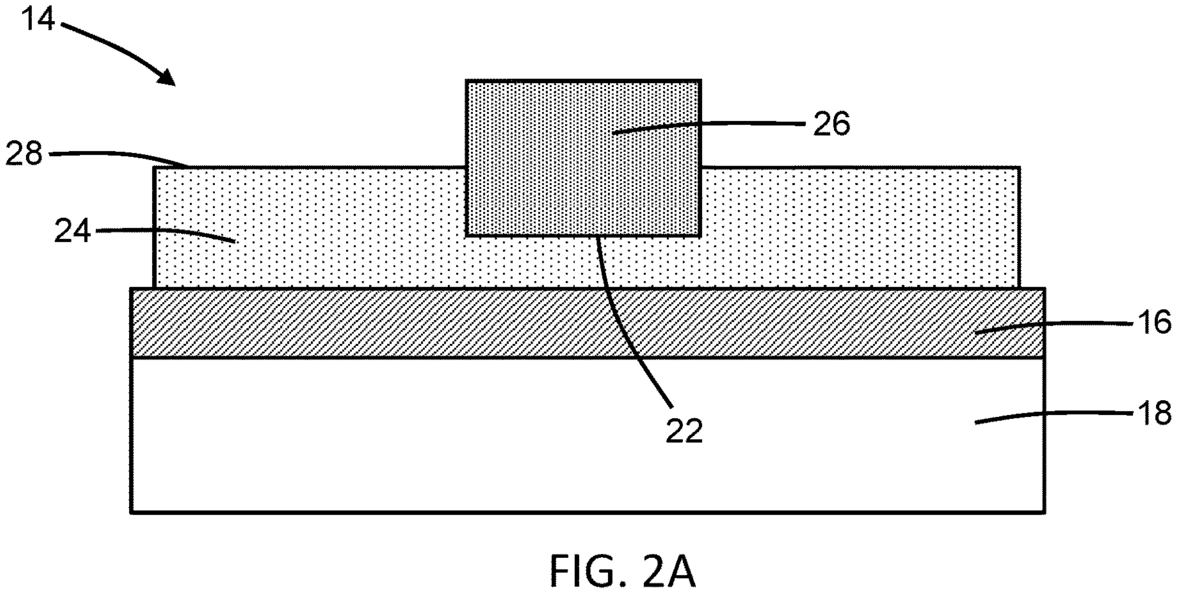
FIG. 2A is a cross-sectional view taken generally along line 2A-2A in FIG. 1.

With reference to FIGS. 1, 2, 2A and in accordance with embodiments of the invention, a structure 10 includes a waveguide core 12 and a photodetector 14 that are positioned on, and above, a dielectric layer 16 and a semiconductor substrate 18. In an embodiment, the dielectric layer 16 may be comprised of a dielectric material, such as silicon dioxide, and the semiconductor substrate 18 may be comprised of a semiconductor material, such as single-crystal silicon. In an embodiment, the dielectric layer 16 may be disposed between the waveguide core 12 and the semiconductor substrate 18, and the dielectric layer 16 may be a buried oxide layer of a silicon-on-insulator substrate, and the dielectric layer 16 may provide low-index cladding for the waveguide core 12 and the photodetector 14.

The waveguide core 12 includes a section 20 that is positioned adjacent to the photodetector 14. The section 20, which extends lengthwise along a longitudinal axis 15, has a sidewall 17 and a sidewall 19 opposite from the sidewall 17. The waveguide core 12 may include a slab layer 30 that extends outwardly from each of the sidewalls 17, 19. The slab layer 30 may be formed when the waveguide core 12 is formed, and the slab layer 30 may have a thickness that is less than the thickness of the section 20 of the waveguide core 12. The slab layer 30 is connected at each of the sidewalls 17, 19 to a lower portion of the section 20 of the waveguide core 12.

The photodetector 14 includes a pad 24 having a side edge 23, a side edge 25 opposite from the side edge 23, a side edge 27, and a side edge 29 opposite from the side edge 27. The side edges 23, 25, 27, 29 may surround an outer perimeter of the pad 24, and the side edges 23, 25, 27, 29 may extend to the dielectric layer 16. In an embodiment, the section 20 and the slab layer 30 of the waveguide core 12 may be adjoined to the side edge 23 of the pad 24.

In an embodiment, the waveguide core 12 and the pad 24 of the photodetector 14 may be comprised of a material having a refractive index that is greater than the refractive index of silicon dioxide. In an embodiment, the waveguide core 12 and the pad 24 of the photodetector 14 may be comprised of a semiconductor material. In an embodiment, the waveguide core 12 and the pad 24 of the photodetector 14 may be comprised of single-crystal silicon. The waveguide core 12 and the pad 24 of the photodetector 14 may be formed by patterning a layer comprised of their constituent material with lithography and etching processes. In an embodiment, the waveguide core 12 and the pad 24 of the photodetector 14 may be formed by patterning the semiconductor material (e.g., single-crystal silicon) of a device layer of a silicon-on-insulator substrate.

The photodetector 14 further includes a semiconductor layer 26 providing a light-absorbing layer that is disposed on the pad 24 with an inward spacing from the outer perimeter of the pad 24. The semiconductor layer 26 extends lengthwise on the pad 24 along a longitudinal axis 36. The semiconductor layer 26 may have a sidewall 34 that is positioned adjacent to the side edge 23 of the pad 24, a sidewall 35 that is positioned adjacent to the side edge 25 of the pad 24, a sidewall 37 that is positioned adjacent to the side edge 27 of the pad 24, and a sidewall 39 that is positioned adjacent to the side edge 29 of the pad 24. In an embodiment, the semiconductor layer 26 may be disposed equidistant from the side edge 27 and the side edge 29. The section 20 of the waveguide core 12 is laterally offset along the side edge 32 from the longitudinal axis 36 of the semiconductor layer 26. In an embodiment, the section 20 of the waveguide core 12 may be laterally offset along the side edge 23 of the pad 24 between the sidewall 37 of the semiconductor layer 26 and the side edge 27 of the pad 24.

The semiconductor layer 26 of the photodetector 14 may be comprised of a light-absorbing material that can generate charge carriers from photons of absorbed light by photoelectric conversion. In an embodiment, the semiconductor layer 26 may be comprised of an intrinsic semiconductor material. In an embodiment, the semiconductor layer 26 may be comprised of intrinsic germanium. In an embodiment, the semiconductor layer 26 may be comprised of intrinsic silicon-germanium. In an alternative embodiment, the semiconductor layer 26 may be comprised of a different type of semiconductor material, such as a III-V compound semiconductor material or intrinsic silicon.

The semiconductor layer 26 may be formed by an epitaxial growth process. In an embodiment, the semiconductor layer 26 may be epitaxially grown inside a trench 22 that is patterned in the pad 24 such that the semiconductor layer 26 includes a lower portion disposed below a top surface 28 of the pad 24 and an upper portion disposed above the top surface 28 of the pad 24. A hardmask comprised of a dielectric material may be disposed on the top surface 28 of the pad 24 and surround the trench 22 during the epitaxial growth process and may be removed following the epitaxial growth process.

Figure 3:
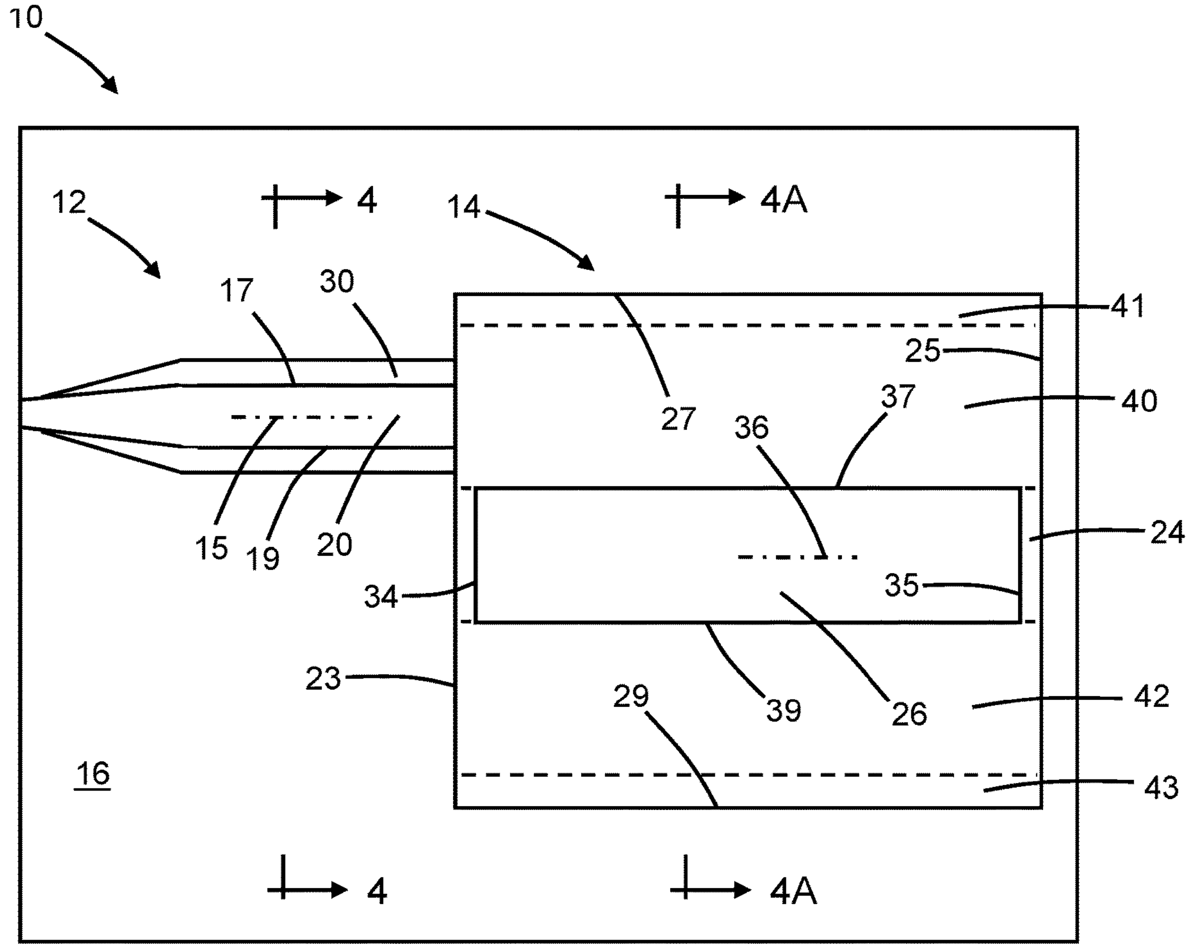
FIG. 3 is a top view of the structure at a fabrication stage of the processing method subsequent to FIGS. 1, 2, 2A.
Figure 4:
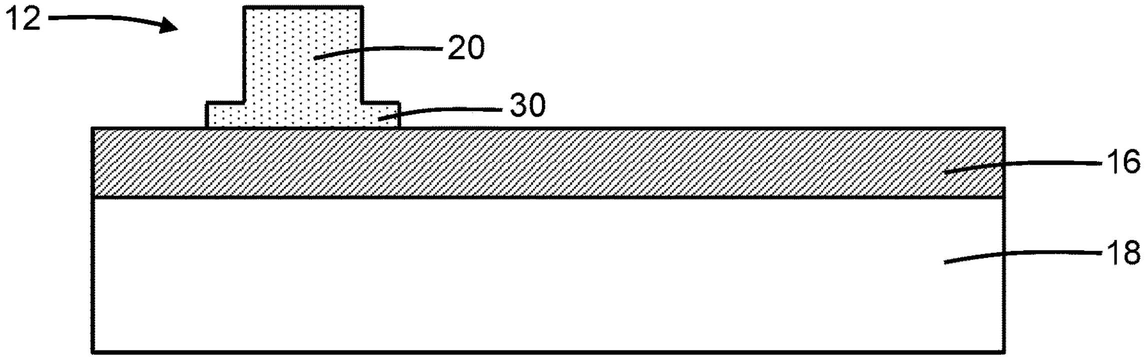
FIG. 4 is a cross-sectional view taken generally along line 4-4 in FIG. 3.
Figure 4A:
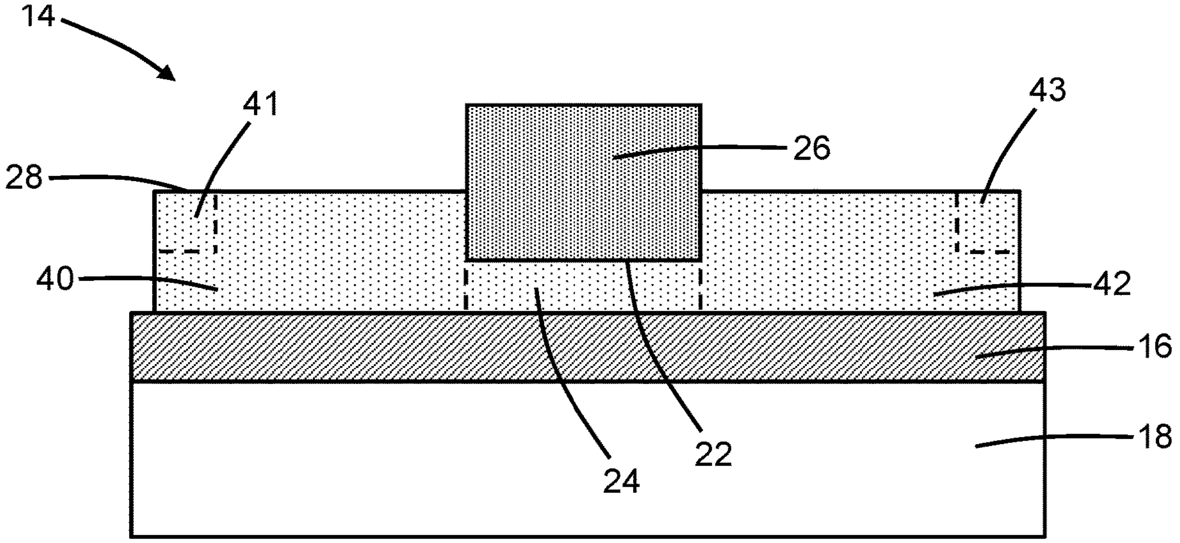
FIG. 4A is a cross-sectional view taken generally along line 4A-4A in FIG. 3.

With reference to FIGS. 3, 4, 4A in which like reference numerals refer to like features in FIGS. 1, 2, 2A and at a subsequent fabrication stage, the structure 10 may include a doped region 40 formed in a portion of the pad 24 adjacent to the sidewall 37 of the semiconductor layer 26 and a doped region 42 that is formed in a portion of the pad 24 adjacent to the sidewall 39 of the semiconductor layer 26. The semiconductor layer 26 is laterally positioned between the doped region 40 and the doped region 42. The doped regions 40, 42, which differ in conductivity type, may extend fully through the entire thickness of the pad 24 to the underlying dielectric layer 16. The doped region 40 and the doped region 42 may respectively define an anode and a cathode of the photodetector 14.

The doped region 40 may be formed by, for example, ion implantation with an implantation mask having an opening that determines the implanted area of the pad 24. The implantation mask may include a layer of photoresist applied by a spin-coating process, pre-baked, exposed to light projected through a photomask, baked after exposure, and developed with a chemical developer to define the opening over the area of the pad 24 to be implanted. The implantation conditions, such as ion species, dose, and kinetic energy, may be selected to tune the electrical and physical characteristics of the doped region 40. The implantation mask may be stripped after forming the doped region 40. In an embodiment, the semiconductor material of the doped region 40 may contain a p-type dopant, such as boron, that provides p-type electrical conductivity. In an alternative embodiment, a portion of the semiconductor layer 26 immediately adjacent to the doped region 40 and an underlying portion of the pad 24 may be implanted with the p-type dopant due to partial overlap of the opening in the implantation mask with the semiconductor layer 26.

The doped region 42 may be formed by, for example, ion implantation with an implantation mask having an opening that determines an implanted area of the pad 24. The implantation mask may include a layer of photoresist applied by a spin-coating process, pre-baked, exposed to light projected through a photomask, baked after exposure, and developed with a chemical developer to define the opening over the area of the pad 24 to be implanted. The implantation conditions, such as ion species, dose, and kinetic energy, may be selected to tune the electrical and physical characteristics of the doped region 42. The implantation mask may be stripped after forming the doped region 42. In an embodiment, the semiconductor material of the doped region 42 may contain an n-type dopant, such as phosphorus or arsenic, that provides n-type electrical conductivity. In an alternative embodiment, a portion of the semiconductor layer 26 immediately adjacent to the doped region 42 and an underlying portion of the pad 24 may be implanted with the n-type dopant due to overlap of the opening in the implantation mask. In an alternative embodiment, a portion of the semiconductor layer 26 immediately adjacent to the doped region 42 and an underlying portion of the pad 24 may be implanted with the n-type dopant due to partial overlap of the opening in the implantation mask with the semiconductor layer 26.

A portion of the pad 24 beneath the semiconductor layer 26 may be comprised of intrinsic semiconductor material, such as intrinsic silicon, that is not doped by the ion implantations forming the doped regions 40, 42. In an embodiment, the intrinsic portion of the pad 24 may extend beneath the semiconductor layer 26 from the side edge 23 of the pad 24 to the side edge 25 of the pad 24. The doped region 40, the intrinsic semiconductor materials of the semiconductor layer 26 and the portion of the pad 24 beneath the semiconductor layer 26, and the doped region 42 may define a lateral p-i-n diode structure that enables the functionality of the photodetector 14.

A heavily-doped region 41 may be formed by a masked ion implantation in a portion of the doped region 40 adjacent to the side edge 27. A heavily-doped region 43 may be formed by a masked ion implantation in a portion of the doped region 42 adjacent to the side edge 29. The heavily-doped region 41 may have the same conductivity type as the doped region 40 but at a higher dopant concentration. The heavily-doped region 43 may have the same conductivity type as the doped region 42 but at a higher dopant concentration.

Figure 5:
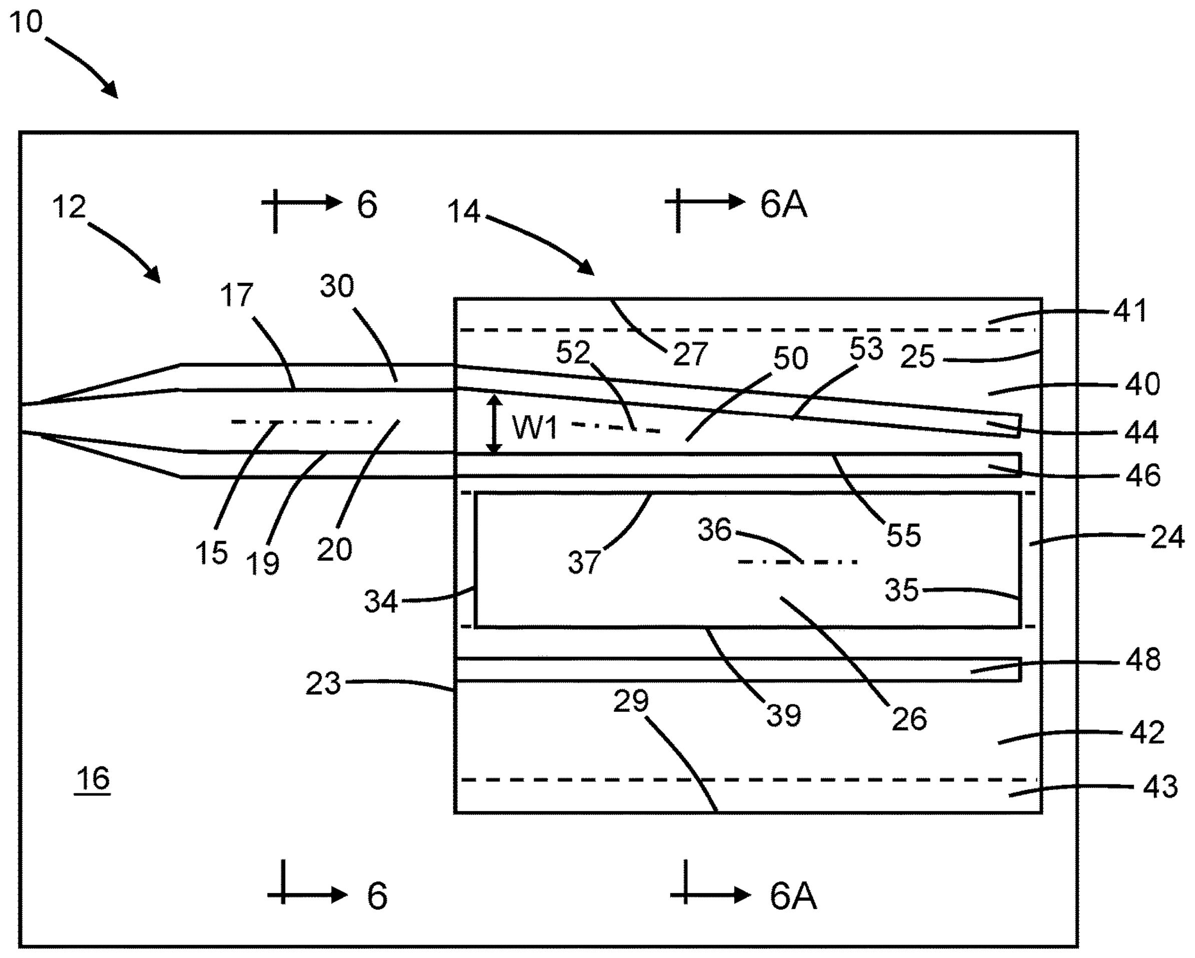
FIG. 5 is a top view of the structure at a fabrication stage of the processing method subsequent to FIGS. 3, 4, 4A.
Figure 6:
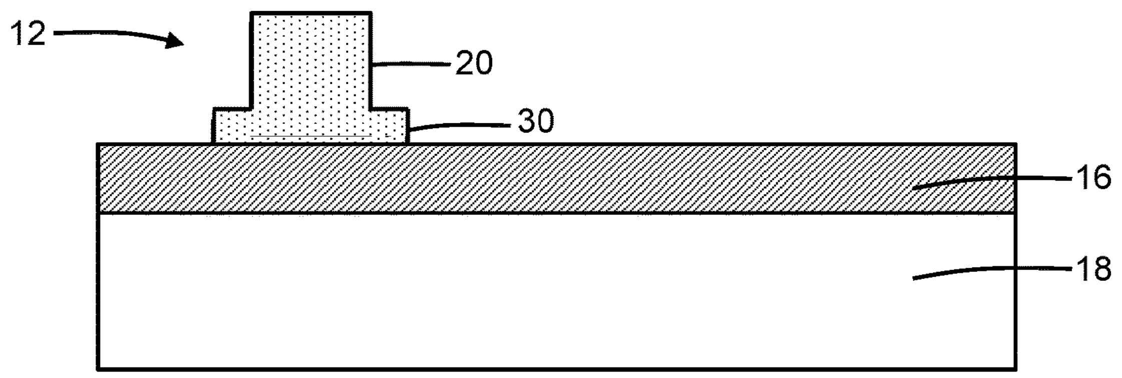
FIG. 6 is a cross-sectional view taken generally along line 6-6 in FIG. 5.
Figure 6A:
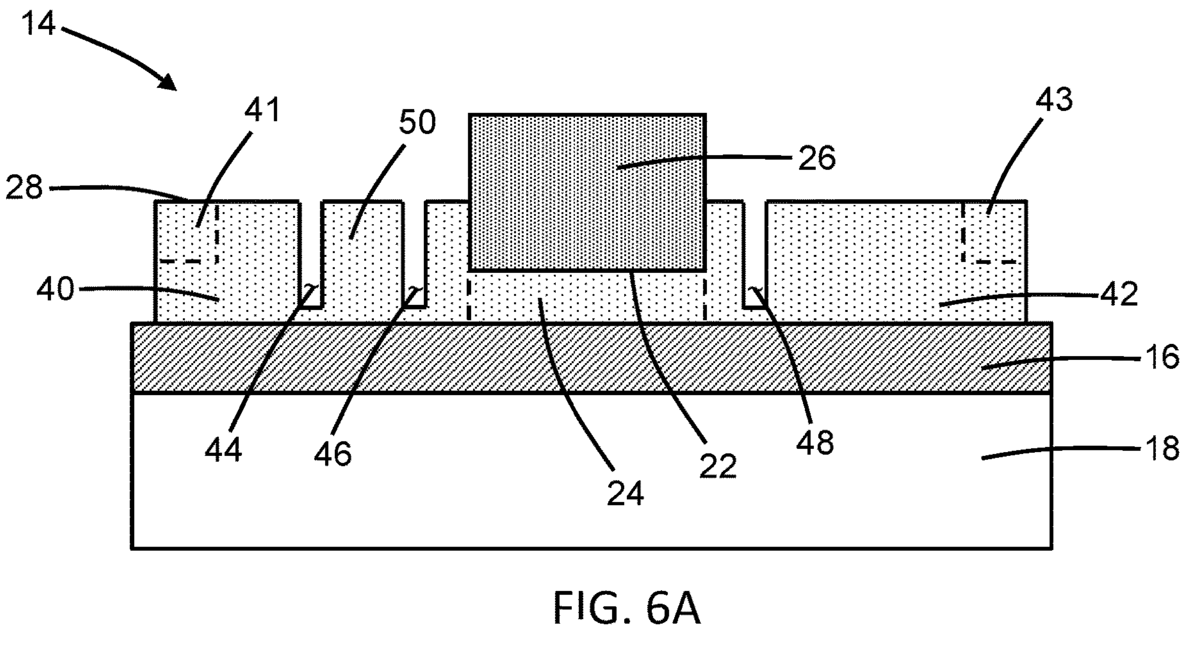
FIG. 6A is a cross-sectional view taken generally along line 6A-6A in FIG. 5.

With reference to FIGS. 5, 6, 6A in which like reference numerals refer to like features in FIGS. 3, 4, 4A and at a subsequent fabrication stage, a trench 44, a trench 46, and a trench 48 are formed that penetrate partially through the pad 24. The trenches 44, 46, 48 may be formed by lithography and etching processes that pattern the semiconductor material of the pad 24. The lithography mask may include a layer of photoresist applied by a spin-coating process, pre-baked, exposed to light projected through a photomask, baked after exposure, and developed with a chemical developer to define openings over the areas of the pad 24 to be etched. In an embodiment, the etching process may be an anisotropic etching process. In an embodiment, the depth of the trenches 44, 46, 48 may differ from the depth of the trench 22 holding the semiconductor layer 26. For example, the depth of the trenches 44, 46, 48 may be greater than the depth of the trench 22 holding the semiconductor layer 26. In an alternative embodiment, the depth of the trenches 44, 46, 48 may be equal to the depth of the trench 22 holding the semiconductor layer 26. The thinned semiconductor material of the doped region 40 at the bottoms of the partially-etched trenches 44, 46 preserves a portion of the doped region 40 that couples the portion of the pad 24 beneath the semiconductor layer 26 to the heavily-doped region 41.

The trench 44 and the trench 46 may be disposed in a spaced relationship on one side of the semiconductor layer 26 between the side edge 27 of the pad 24 and the sidewall 37 of the semiconductor layer 26. The trench 48 may be disposed on an opposite side of the semiconductor layer 26 between the side edge 29 of the pad 24 and the sidewall 39 of the semiconductor layer 26. In an embodiment, the trenches 44, 46, 48 may intersect the side edge 23 of the pad 24. In an embodiment, the trenches 44, 46 may intersect the side edge 23 of the pad 24 in alignment with the portions of the slab layer 30 extending outwardly from the opposite sidewalls 17, 19 of the section 20 of the waveguide core 12. In an embodiment, the trenches 44, 46, 48 may also terminate at an end adjacent to the side edge 25 of the pad 24 and the sidewall 35 of the semiconductor layer 26. The spacing between the trench 44 and the trench 46 may decrease with increasing distance from the side edge 23 and decreasing distance from the side edge 25.

The portion of the semiconductor material of the pad 24 between the trench 44 and the trench 46 defines a waveguide core 50 that is structurally and functionally integrated into the pad 24. The waveguide core 50 includes a sidewall 53 and a sidewall 55 opposite from the sidewall 53. The sidewall 53 of the waveguide core 50 is disposed adjacent to the side edge 27 of the pad 24 and the sidewall 55 of the waveguide core 50 is disposed adjacent to the sidewall 37 of the semiconductor layer 26. The waveguide core 50 has a top surface that is coplanar with the top surface 28 of the pad 24.

The waveguide core 50 provides an optical coupler configured to laterally transfer light received from the section 20 of the waveguide core 12 to the photodetector 14. The waveguide core 50 is tapered with a width dimension W1 that decreases with increasing distance from the side edge 23 of the pad 24. The tapering of the waveguide core 50 promotes the coupling of light from the waveguide core 50 to the semiconductor layer 26. The sidewall 55 of the waveguide core 50 is separated from the sidewall 37 of the semiconductor layer 26 by a gap across which the light is laterally transferred. In an embodiment, the gap between the sidewall 55 of the waveguide core 50 and the sidewall 37 of the semiconductor layer 26 may be uniform with position between the side edge 23 of the pad 24 and the side edge 25 of the pad 24. In an alternative embodiment, the gap between the sidewall 55 of the waveguide core 50 and the sidewall 37 of the semiconductor layer 26 may vary with position between the side edge 23 of the pad 24 and the side edge 25 of the pad 24.

The waveguide core 50 extends lengthwise along a longitudinal axis 52 that is inclined relative to the longitudinal axis 36 of the semiconductor layer 26. The longitudinal axis 52 of the waveguide core 50 is laterally offset from the longitudinal axis 36 of the semiconductor layer 26. In an embodiment, the waveguide core 50 may be laterally offset along the side edge 23 of the pad 24 between the sidewall 37 of the semiconductor layer 26 and the side edge 27 of the pad 24. The lateral offset of the waveguide core 50 compensates for the lateral offset of the section 20 of the waveguide core 12 and enables the lateral offset of the section 20 of the waveguide core 12.

Figure 7:
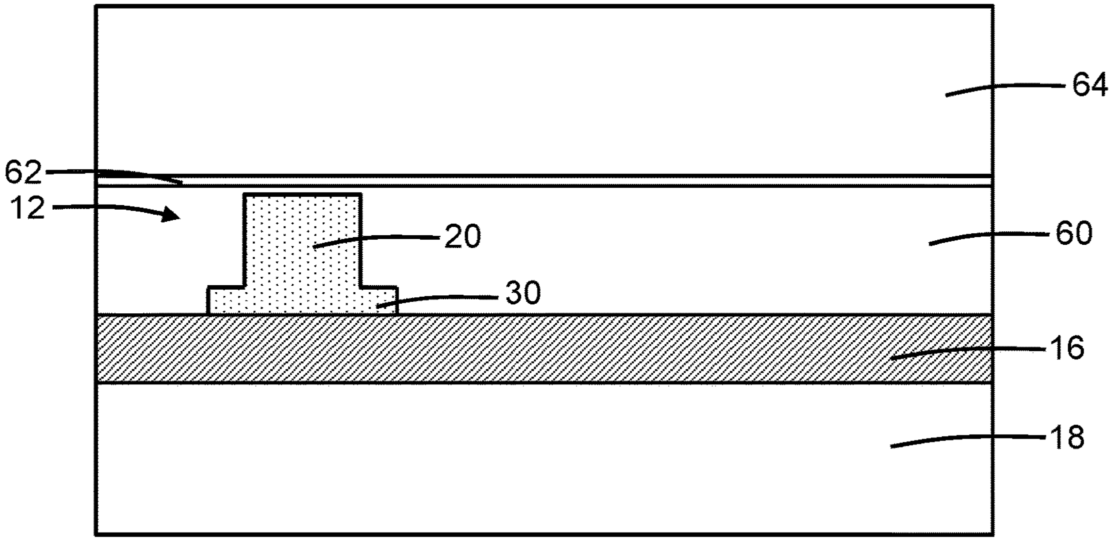
FIGS. 7, 7A are cross-sectional views of the structure at a fabrication stage of the processing method subsequent to FIGS. 5, 6, 6A.
Figure 7A:
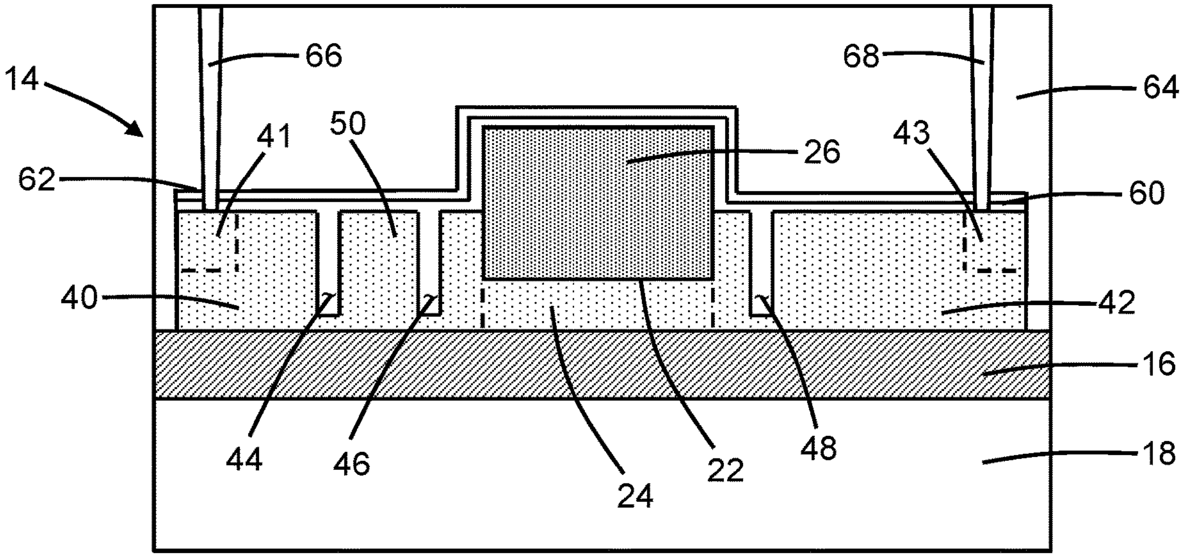

With reference to FIGS. 7, 7A in which like reference numerals refer to like features in FIGS. 5, 6, 6A and at a subsequent fabrication stage, a dielectric layer 60 is formed over the waveguide core 12 and the photodetector 14. In an embodiment, the dielectric layer 60 may be comprised of a dielectric material, such as silicon dioxide. The dielectric material of the dielectric layer 60 may fill the trenches 44, 46, 48. The dielectric material in the trenches 44, 46 provides low-index cladding for the waveguide core 50. The index contrast between the dielectric material in the trenches 44, 46 and the waveguide core 50 enables the guided propagation of light in the waveguide core 50 over a coupling region adjacent to the semiconductor layer 26.

The dielectric material in the trench 48 provides an index contrast with the semiconductor material of the pad 24 that permits the trench 48 to function as a mode confiner that improves light coupling to the semiconductor layer 26. In that regard, the mode confinement provided by the trench 48 and the dielectric material in the trench 48 may push the electromagnetic field associated with the light guided by the waveguide core 50 toward the semiconductor layer 26. In an alternative embodiment, the trench 48 may be omitted from the structure 10.

A conformal dielectric layer 62 may be formed that extends across the waveguide core 12 and photodetector 14 and that follows the topography created by the semiconductor layer 26. In an embodiment, the conformal dielectric layer 62 may be comprised of a dielectric material, such as silicon nitride. A dielectric layer 64 may be formed on the conformal dielectric layer 62. In an embodiment, the dielectric layer 64 may be comprised of a dielectric material, such as silicon dioxide, that has a lower refractive index than the material of the waveguide core 12. The dielectric layer 64 may be deposited and planarized by chemical-mechanical polishing.

Contacts 66 may be formed that penetrate fully through the dielectric layers 60, 62, 64 to land on the heavily-doped region 41, and contacts 68 may be formed that penetrate fully through the dielectric layers 60, 62, 64 to land on the heavily-doped region 43. The heavily-doped region 41 electrically couples the contacts 66 to the doped region 40 with a reduced contact resistance. The heavily-doped region 43 electrically couples the contacts 68 to the doped region 42 with a reduced contact resistance. The contacts 66, 68 may be comprised of a metal, such as tungsten. The doped regions 40, 42 may be biased through the contacts 66, 68, which may be coupled to interconnects (not shown) in dielectric layers formed over the dielectric layer 64.

In use, light, such as laser light, propagates in the waveguide core 12 toward the photodetector 14 and is transferred at the side edge 23 of the pad 24 from the section 20 of the waveguide core 12 to the waveguide core 50. The waveguide core 12 and waveguide core 50 may support propagation of light with transverse-electric polarization, transverse-magnetic polarization, or a combination of both polarizations. Light guided by the waveguide core 50 is then laterally coupled by the waveguide core 50 to the semiconductor layer 26 of the photodetector 14. In an embodiment, the light received by the photodetector 14 may be modulated as an optical signal. The semiconductor layer 26 absorbs photons of the laterally-transferred light and converts the absorbed photons into charge carriers by photoelectric conversion. The biasing of the doped regions 40, 42 causes the charge carriers to be collected and output from the photodetector 14 to provide, as a function of time, a measurable photocurrent.

The waveguide core 50 integrated into the semiconductor layer 26 may function as a mode-evolution-based optical coupler that improves the responsivity of the photodetector 14. The improvement in responsivity of the photodetector 14, particularly at high optical powers, may provide a significant improvement in system level performance.

Figure 8:
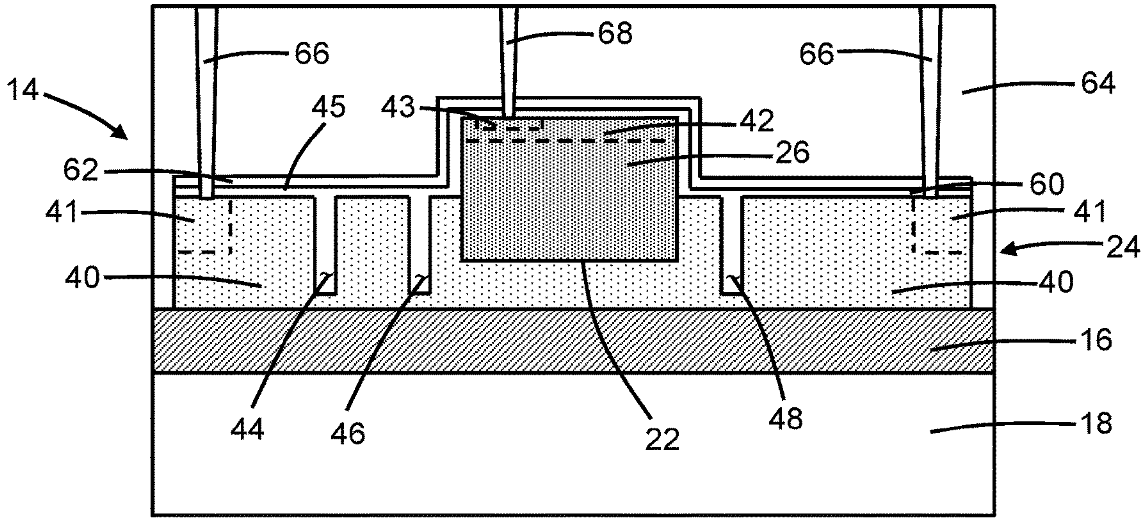
FIGS. 8, 8A are cross-sectional views of structures in accordance with alternative embodiments of the invention.
Figure 8A:
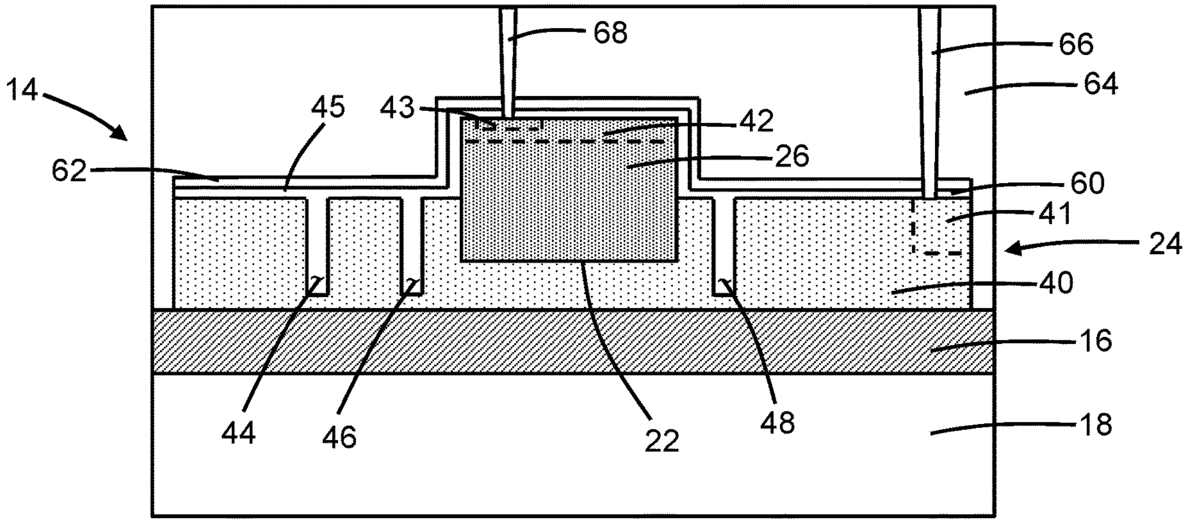

With reference to FIGS. 8, 8A and in accordance with alternative embodiments, the structure 10 may be modified such that the photodetector 14 has a vertical arrangement instead of a lateral arrangement. Specifically, as shown in FIG. 8, the doped region 40 may be extend across the entire pad 24, heavily-doped regions 41 may be disposed in the pad 24 on both sides of the semiconductor layer 26, and the doped region 42 and heavily-doped region 43 may be disposed in an upper portion of the semiconductor layer 26. In an alternative embodiment and as shown in FIG. 8A, the structure 10 may be configured with a heavily-doped region 41 disposed in the pad 24 adjacent to only one side of the semiconductor layer 26.

In an alternative embodiment, the semiconductor layer 26 may be fully disposed on, and above, the top surface 28 of the pad 24. In an alternative embodiment, the photodetector 14 may be configured as an avalanche photodetector that includes a region of intrinsic semiconductor material in the pad 24 defining a multiplication region and an additional doped region in the pad 24 defining a charge control region.

Figure 9:
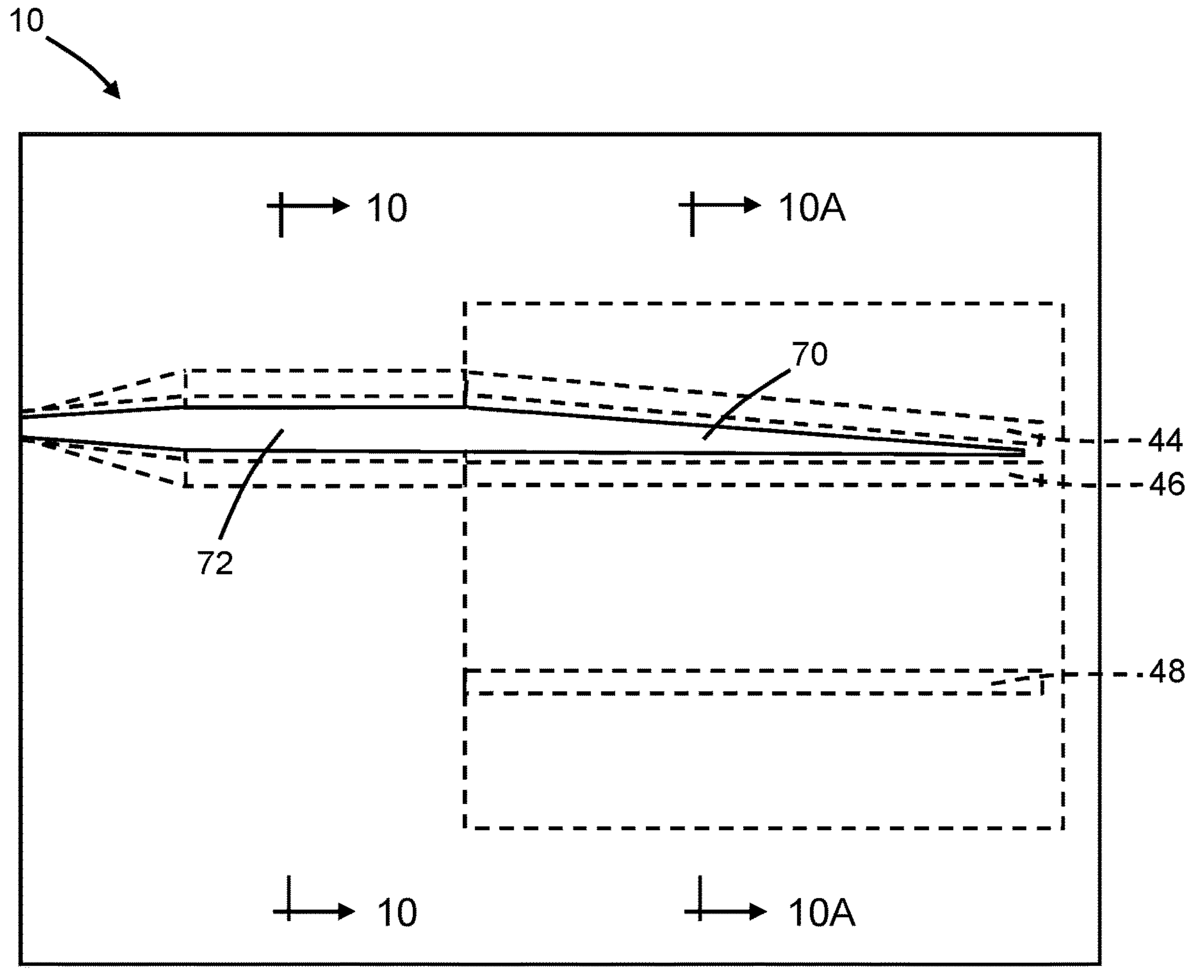
FIG. 9 is a top view of a structure in accordance with alternative embodiments of the invention.
Figure 10:
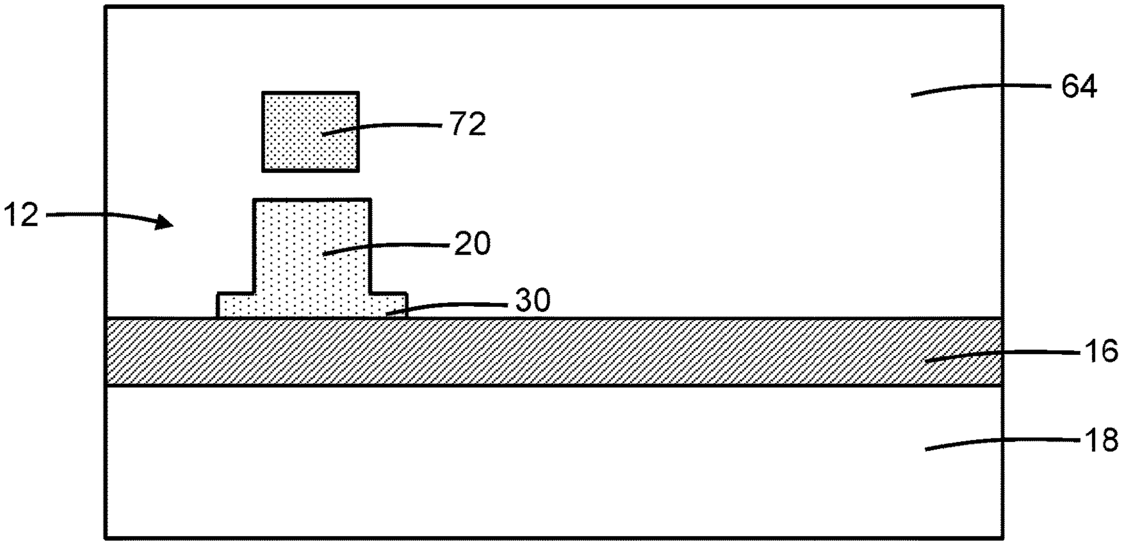
FIG. 10 is a cross-sectional view taken generally along line 10-10 in FIG. 9.
Figure 10A:
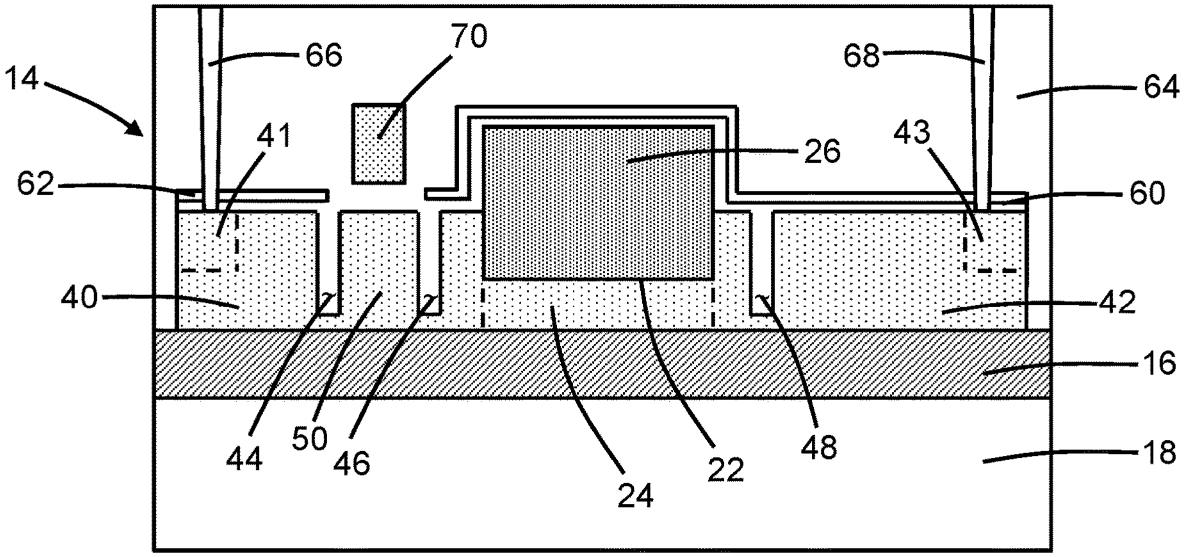
FIG. 10A is a cross-sectional view taken generally along line 10A-10A in FIG. 9.

With reference to FIGS. 9, 10, 10A and in accordance with alternative embodiments, the structure 10 may further include a waveguide core 70 that is disposed in elevation over the waveguide core 50 to define a stacked waveguiding structure. The structure 10 may also further include a waveguide core 72 that is disposed in elevation over at least the section 20 of the waveguide core 12 to define a stacked waveguiding structure. In an embodiment, the waveguide cores 70, 72 may be comprised of a different material than the waveguide core 12 and the waveguide core 50. In an embodiment, the waveguide cores 70, 72 may be comprised of a dielectric material, such as silicon nitride. In an alternative embodiment, the waveguide cores 70, 72 may be comprised of a semiconductor material, such as polysilicon.

In an embodiment, the waveguide core 72 may be narrower than the waveguide core 12 and centered above the waveguide core 12 with intervening dielectric material. A section of the dielectric layer 62 may be removed from the region between the waveguide core 70 and the waveguide core 12. The waveguide core 70 may be narrower than the waveguide core 50 and centered above the waveguide core 50 with intervening dielectric material. In an embodiment, the width dimension of the waveguide core 70 may taper in coordination with the tapering of the waveguide core 50. For example, the waveguide core 70 may taper at the same taper angle or set of taper angles as the waveguide core 50.

Figure 11:
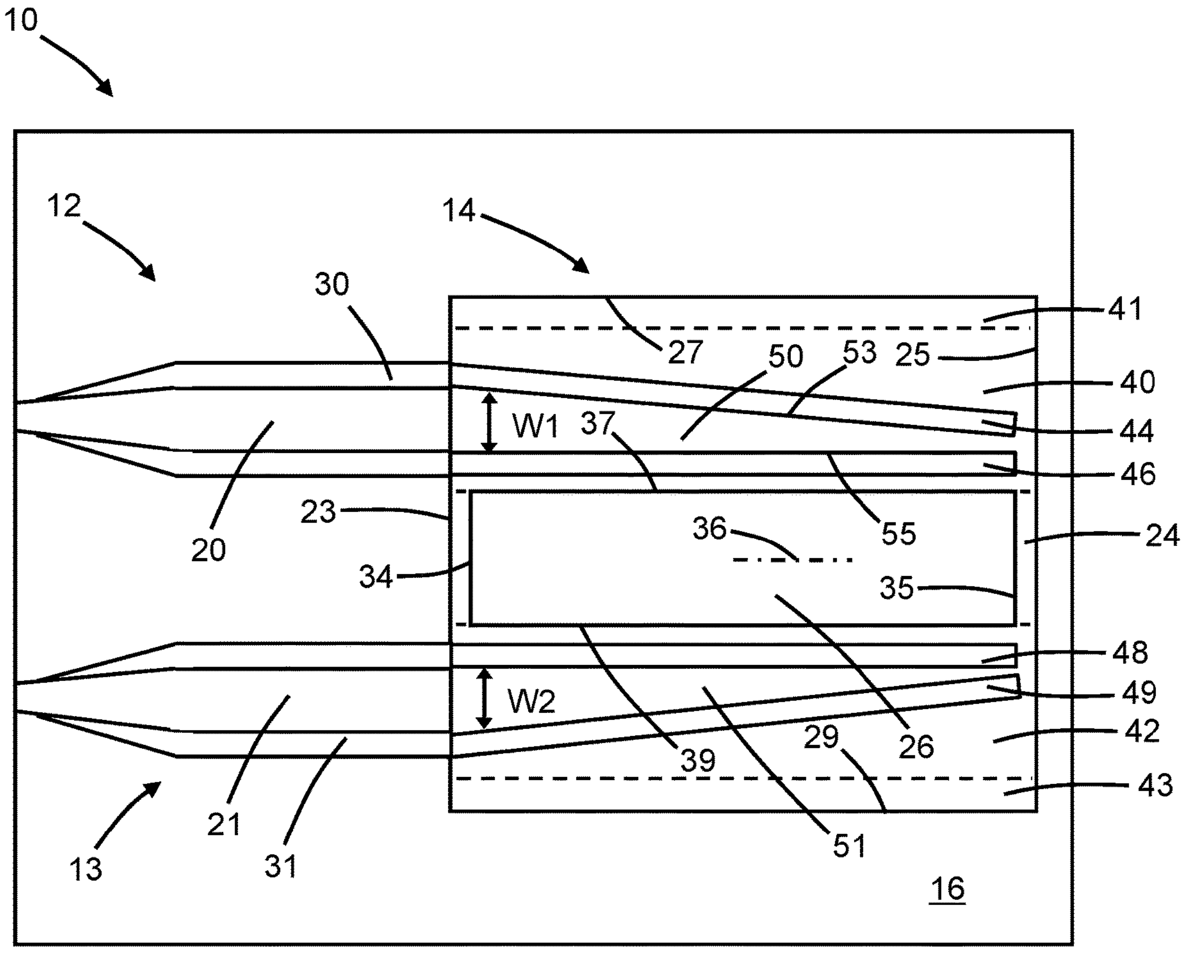
FIG. 11 is a top view of a structure in accordance with alternative embodiments of the invention.

With reference to FIG. 11 and in accordance with alternative embodiments, the structure 10 may further include a waveguide core 13 having a section 21 that is positioned adjacent to the photodetector 14. The section 21 may have a slab layer 31 that extends outwardly from each of its opposite sidewalls. The waveguide core 13, the section 21 of the waveguide core 13, and the slab layer 31 may be respectively similar or identical in construction to the waveguide core 12, the section 20 of the waveguide core 12, and the slab layer 30. The section 21 and slab layer 31 of the waveguide core 13 may adjoin the side edge 23 of the pad 24. The section 21 of the waveguide core 13 may be disposed along the side edge 23 of the pad 24 on an opposite side of the semiconductor layer 26 from the section 20 of the waveguide core 12. In an embodiment, the waveguide core 13 may be comprised of the same material as the waveguide core 12 and the pad 24 of the photodetector 14, and the slab layer 31 may be comprised of the same material as the slab layer 30.

The structure 10 may also include a trench 49 that penetrates partially through the pad 24. The trench 49 may be formed by lithography and etching processes when the trenches 44, 46, 48 are formed. The trench 49 is disposed on the same side of the semiconductor layer 26 as the trench 48. The trench 48 is disposed between the trench 49 and the sidewall 39 of the semiconductor layer 26, and the trench 49 is disposed between the trench 48 and the side edge 29 of the pad 24. In an embodiment, the trench 49 may intersect the side edge 23 of the pad 24. In an embodiment, the trenches 48, 49 may intersect the side edge 23 of the pad 24 in alignment with the portions of the slab layer 31 extending outwardly from the opposite sidewalls of the section 21 of the waveguide core 13. In an embodiment, the trench 49 may also terminate at an end adjacent to the side edge 25 of the pad 24 and the sidewall 35 of the semiconductor layer 26.

The portion of the pad 24 between the trench 48 and the trench 49 defines a waveguide core 51 that is structurally and functionally integrated into the pad 24. The waveguide core 51 includes a sidewall disposed adjacent to the side edge 29 of the pad 24 and a sidewall disposed adjacent to the sidewall 39 of the semiconductor layer 26. The thinned material of the doped region 42 at the bottom of the partially-etched trenches 48, 49 preserves a portion of the doped region 42 connecting the portion of the pad 24 beneath the semiconductor layer 26 and the heavily-doped region 43.

The waveguide core 51 provides an optical coupler configured to laterally transfer light received from the section 21 of the waveguide core 13 to the photodetector 14. The waveguide core 51 is tapered with a width dimension W2 that decreases with increasing distance from the side edge 23 of the pad 24. The tapering of the waveguide core 51 promotes light transfer from the waveguide core 51 to the semiconductor layer 26 of the photodetector 14. A sidewall of the waveguide core 51 is separated from the adjacent sidewall 39 of the semiconductor layer 26 by a gap that may be uniform with position between the side edge 23 of the pad 24 and the side edge 25 of the pad 24 or that may vary with position between the side edge 23 of the pad 24 and the side edge 25 of the pad 24.

The waveguide core 51 is laterally offset from the longitudinal axis 36 of the semiconductor layer 26. In an embodiment, the waveguide core 51 may be laterally offset along the side edge 23 of the pad 24 between the sidewall 39 of the semiconductor layer 26 and the side edge 29 of the pad 24. The lateral offset of the waveguide core 51 compensates for the lateral offset of the section 21 of the waveguide core 13 and enables the lateral offset of the section 21 of the waveguide core 13. Similar to the waveguide core 50, the waveguide core 51 has a longitudinal axis that is inclined relative to the longitudinal axis 36 of the semiconductor layer 26.

The section 21 of the waveguide core 13 and the waveguide core 51 supply another input to the photodetector 14 in addition to the input provided by the section 20 of the waveguide core 12 and the waveguide core 50. The total optical power delivered to the photodetectors 14 may be split between the different inputs, which may further improve the responsivity of the photodetector 14 and system level performance, particularly at high optical powers.

Figure 12:
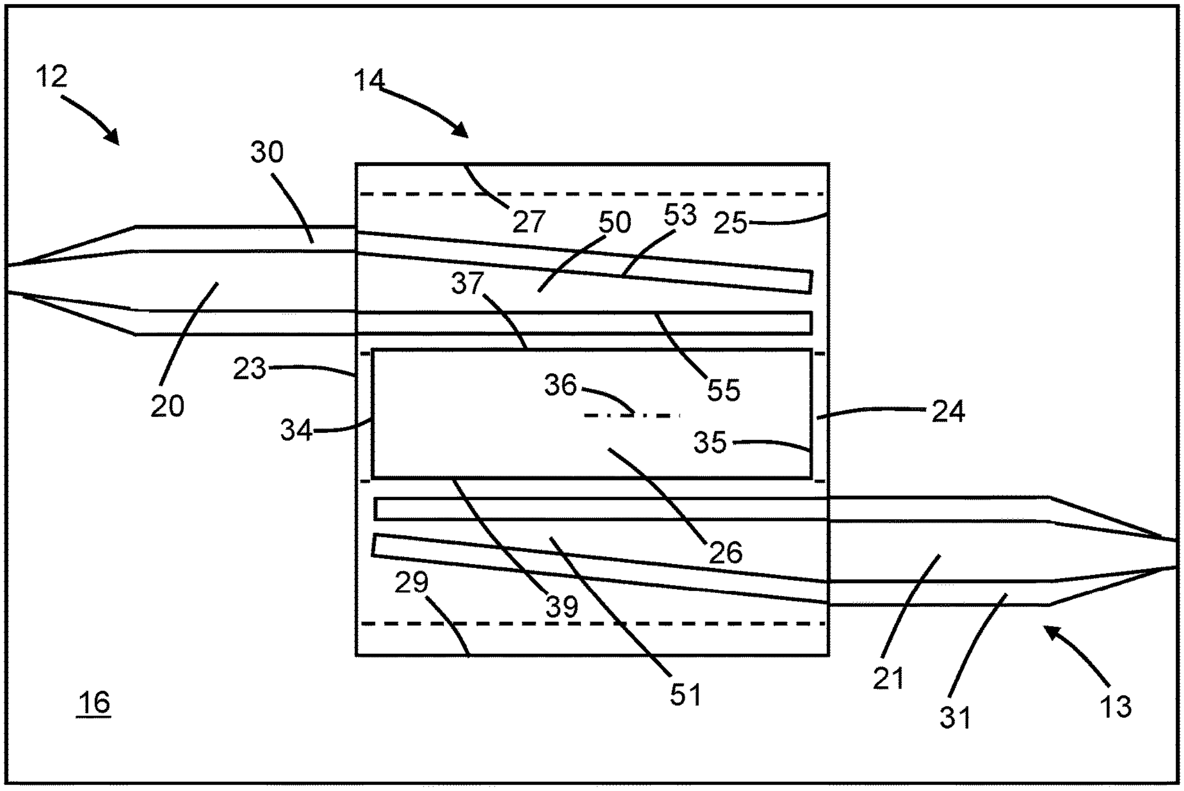
FIG. 12 is a top view of a structure in accordance with alternative embodiments of the invention.

With reference to FIG. 12 and in accordance with alternative embodiments, the section 21 of the waveguide core 13 may adjoin the side edge 25 of the pad 24 instead of the side edge 23, and the trench 49 may be inclined in an opposite direction to form the waveguide core 51 with a taper that is opposite in width dimension change to the tapering of the waveguide core 50. The section 21 of the waveguide core 13 and the waveguide core 51 supply another input to the photodetector 14, in addition to the input provided by the section 20 of the waveguide core 12 and the waveguide core 50, with the photodetector 14 disposed between the different inputs.

Figure 13:
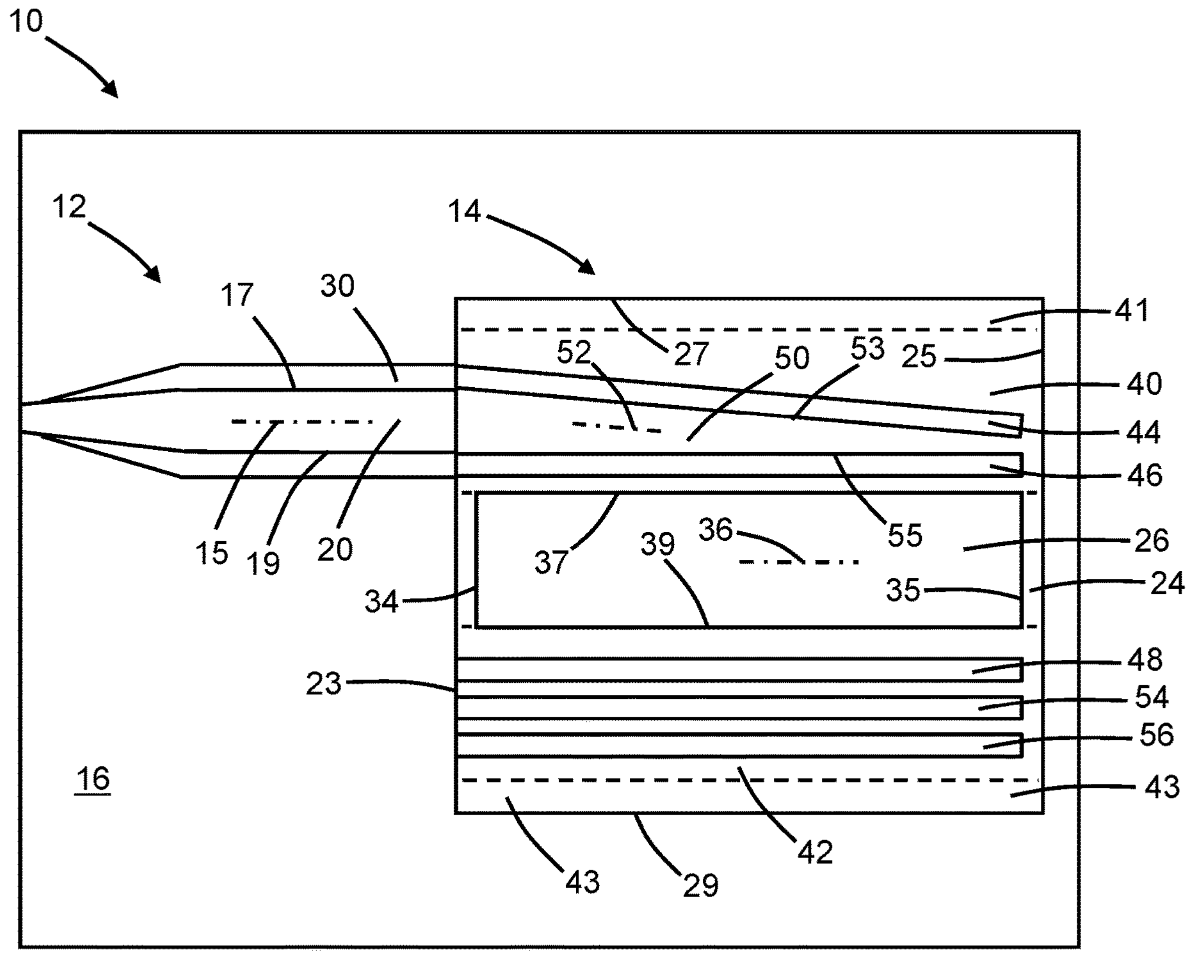
FIG. 13 is a top view of a structure in accordance with alternative embodiments of the invention.

With reference to FIG. 13 and in accordance with alternative embodiments, the structure 10 may also include trenches 54, 56 that penetrate partially through the pad 24. The trenches 54, 56 may be formed by lithography and etching processes when the trenches 44, 46, 48 are formed. The trenches 54, 56 are disposed on the same side of the semiconductor layer 26 as the trench 48, and the trenches 54, 56 are filled by the dielectric material of the subsequently-formed dielectric layer 60. The trenches 48, 54, 56 may be arranged in the rows of a one-dimension array. In an embodiment, the trenches 48, 54, 56 may extend parallel to each other. The dielectric-filled trenches 54, 56, which are additive to the dielectric-filled trench 48, function to further strengthen and reinforce mode confinement and to further improve light coupling to the semiconductor layer 26.

Figure 14:
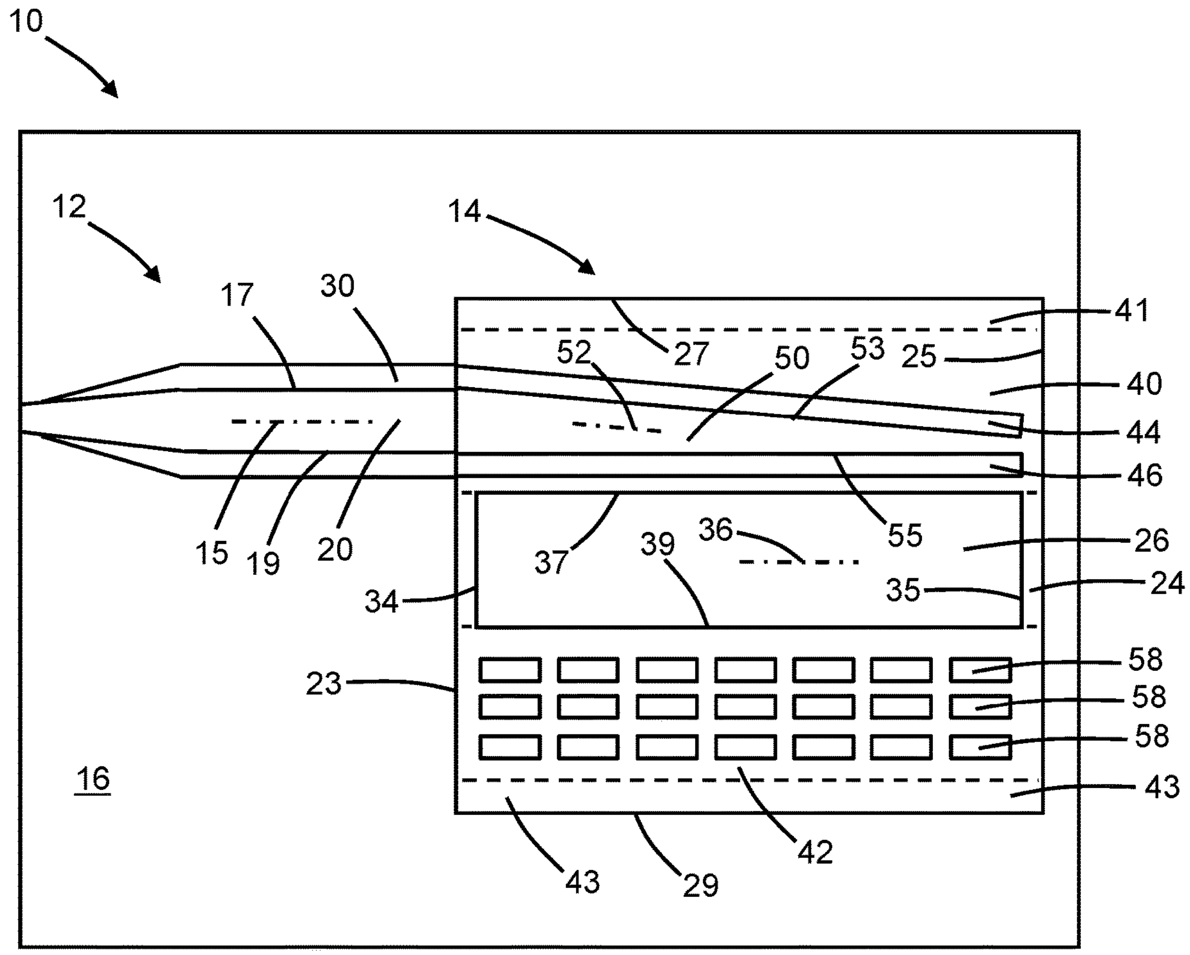
FIG. 14 is a top view of a structure in accordance with alternative embodiments of the invention.

With reference to FIG. 14 and in accordance with alternative embodiments, trenches 58 may be formed that are arranged in the rows and columns of a two-dimensional array. The trenches 58 may be formed by lithography and etching processes when the trenches 44, 46 are formed. The trenches 58 are disposed on an opposite side of the semiconductor layer 26 from the trenches 44, 46, and are filled by the dielectric material of the subsequently-formed dielectric layer 60. The dielectric material in the trenches 58 provides an index contrast with the semiconductor material of the pad 24 and permits the dielectric-filled trenches 58 to provide mode confinement and to improve light coupling to the semiconductor layer 26.

The methods as described above are used in the fabrication of integrated circuit chips. The resulting integrated circuit chips can be distributed by the fabricator in raw wafer form (e.g., as a single wafer that has multiple unpackaged chips), as a bare die, or in a packaged form. The chip may be integrated with other chips, discrete circuit elements, and/or other signal processing devices as part of either an intermediate product or an end product. The end product can be any product that includes integrated circuit chips, such as computer products having a central processor or smartphones.

References herein to terms modified by language of approximation, such as "about", "approximately", and "substantially", are not to be limited to the precise value specified. The language of approximation may correspond to the precision of an instrument used to measure the value and, unless otherwise dependent on the precision of the instrument, may indicate a range of +/−10% of the stated value(s).

References herein to terms such as "vertical", "horizontal", etc. are made by way of example, and not by way of limitation, to establish a frame of reference. The term "horizontal" as used herein is defined as a plane parallel to a conventional plane of a semiconductor substrate, regardless of its actual three-dimensional spatial orientation. The terms "vertical" and "normal" refer to a direction in the frame of reference perpendicular to the horizontal, as just defined. The term "lateral" refers to a direction in the frame of reference within the horizontal plane.

A feature "connected" or "coupled" to or with another feature may be directly connected or coupled to or with the other feature or, instead, one or more intervening features may be present. A feature may be "directly connected" or "directly coupled" to or with another feature if intervening features are absent. A feature may be "indirectly connected" or "indirectly coupled" to or with another feature if at least one intervening feature is present. A feature "on" or "contacting" another feature may be directly on or in direct contact with the other feature or, instead, one or more intervening features may be present. A feature may be "directly on" or in "direct contact" with another feature if intervening features are absent. A feature may be "indirectly on" or in "indirect contact" with another feature if at least one intervening feature is present. Different features "overlap" if a feature extends over, and covers a part of, another feature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A structure for a photonics chip, the structure comprising:

a photodetector including a pad and a semiconductor layer on the pad, the pad including a first side edge and a first waveguide core that extends from the first side edge adjacent to the semiconductor layer, the semiconductor layer having a longitudinal axis, and the first waveguide core including a longitudinal axis that is inclined relative to the longitudinal axis of the semiconductor layer; and a second waveguide core including a section adjoined to the first side edge of the pad adjacent to the first waveguide core.

2. The structure of claim 1 wherein the first waveguide core is laterally offset along the first side edge relative to the longitudinal axis of the semiconductor layer.

3. The structure of claim 2 wherein the pad includes a first trench and a second trench, and the first waveguide core is disposed between the first trench and the second trench, the first trench and the second trench penetrate partially through a thickness of the pad, the first waveguide core comprises a semiconductor material having a first refractive index, and the first trench and the second trench are filled by a dielectric material having a second refractive index that is less than the first refractive index.

4. The structure of claim 1 wherein the pad includes a first trench and a second trench, and the first waveguide core is disposed between the first trench and the second trench.

5. The structure of claim 4 wherein the first trench and the second trench penetrate partially through a thickness of the pad.

6. The structure of claim 4 wherein the first waveguide core comprises a semiconductor material having a first refractive index, and the first trench and the second trench are filled by a dielectric material having a second refractive index that is less than the first refractive index.

7. The structure of claim 6 wherein the pad comprises the semiconductor material.

8. The structure of claim 4 wherein the semiconductor layer includes a first sidewall adjacent to the first waveguide core and a second sidewall, the first trench and the second trench are disposed adjacent to the first sidewall, and the pad includes a third trench disposed adjacent to the second sidewall.

9. The structure of claim 8 wherein the first waveguide core comprises a semiconductor material having a first refractive index, and the first trench, the second trench, and the third trench are filled by a dielectric material having a second refractive index that is less than the first refractive index.

10. The structure of claim 8 wherein the pad includes a fourth trench disposed between the second sidewall and the third trench.

11. The structure of claim 4 wherein the semiconductor layer includes a first sidewall adjacent to the first waveguide core and a second sidewall, the first trench and the second trench are disposed adjacent to the first sidewall, and the pad includes a plurality of trenches disposed in a two-dimensional array adjacent to the second sidewall.

12. The structure of claim 1 wherein the second waveguide core is aligned with the first waveguide core at the first side edge of the pad.

13. The structure of claim 1 wherein the second waveguide core includes a slab layer.

14. The structure of claim 1 wherein the pad includes a third waveguide core that extends from the first side edge adjacent to the semiconductor layer, and further comprising:

a fourth waveguide core including a section adjoined to the first side edge of the pad adjacent to the third waveguide core.

15. The structure of claim 14 wherein the semiconductor layer is disposed between the first waveguide core and the third waveguide core, and the third waveguide core includes a longitudinal axis that is inclined relative to the longitudinal axis of the semiconductor layer.

16. The structure of claim 1 wherein the pad includes a second side edge opposite from the first side edge and a third waveguide core that extends from the second side edge adjacent to the semiconductor layer, and further comprising:

a fourth waveguide core including a section adjoined to the second side edge of the pad.

17. The structure of claim 16 wherein the semiconductor layer is disposed between the first waveguide core and the third waveguide core, and the third waveguide core includes a longitudinal axis that is inclined relative to the longitudinal axis of the semiconductor layer.

18. The structure of claim 1 further comprising:

a third waveguide core disposed over the first waveguide core, wherein the first waveguide core comprises a first material, and the third waveguide core comprises a second material different from the first material.

19. The structure of claim 1 further comprising:

a first doped region in the pad, the first doped region having a first conductivity type; and a second doped region in the pad, the second doped region having a second conductivity type opposite to the first conductivity type, wherein the semiconductor layer is disposed on a portion of the pad between the first doped region and the second doped region, and the portion of the pad comprises intrinsic semiconductor material.

20. A method of forming a structure for a photonics chip, the method comprising:

forming a photodetector that includes a pad and a semiconductor layer on the pad, wherein the pad includes a side edge and a first waveguide core that extends from the side edge adjacent to the semiconductor layer, the semiconductor layer has a longitudinal axis, and the first waveguide core includes a longitudinal axis that is inclined relative to the longitudinal axis of the semiconductor layer; and forming a second waveguide core that includes a section adjoined to the side edge of the pad adjacent to the first waveguide core.

* * * * *